United States Patent [19]

Parks et al.

[11] Patent Number: 4,792,221
[45] Date of Patent: Dec. 20, 1988

[54] VERTICAL PLANE ADJUSTING MECHANISM FOR EYEGLASSES

[75] Inventors: Gerald R. Parks; Chris R. Dawson; John Dondero, all of Chula Vista, Calif.

[73] Assignee: John R. Gregory, Chula Vista, Calif.

[21] Appl. No.: 148,273

[22] Filed: Jan. 25, 1988

[51] Int. Cl.⁴ .............................................. G02C 5/14
[52] U.S. Cl. ................................... 351/120; 351/118; 351/119
[58] Field of Search ............... 351/111, 118, 119, 120, 351/44, 45, 46, 47, 48, 49

[56] References Cited

U.S. PATENT DOCUMENTS

| | | | |
|---|---|---|---|
| 3,189,912 | 6/1965 | Miller | 351/118 |
| 3,271,094 | 9/1966 | Wildernuth | 351/120 |
| 3,841,741 | 10/1974 | Vischer | 351/120 |
| 3,907,410 | 9/1975 | Richmond | 351/119 |
| 4,017,165 | 4/1977 | Davis | 351/120 |

Primary Examiner—Rodney B. Bovernick
Attorney, Agent, or Firm—Charmasson & Holz

[57] ABSTRACT

A mechanism forming the hinges between an eyeglass frame and the lateral temple bars which allows for the rapid adjustment of the vertical alignment of the lens frame in relation to the horizontal axes of the temple pieces. The forward end of each temple piece is split into a stationary half and a sliding half. Each half terminates into a pin or ball which cooperates with a bearing at the edge of the lens frame to form a hinge allowing each temple piece to be folded against the frame. The sliding halves can be moved along the axes of the temple pieces independently from the stationary ones to tilt the hinging axis so as to change the position of the lens plane in relation to the temple pieces.

7 Claims, 1 Drawing Sheet

U.S. Patent     Dec. 20, 1988     4,792,221
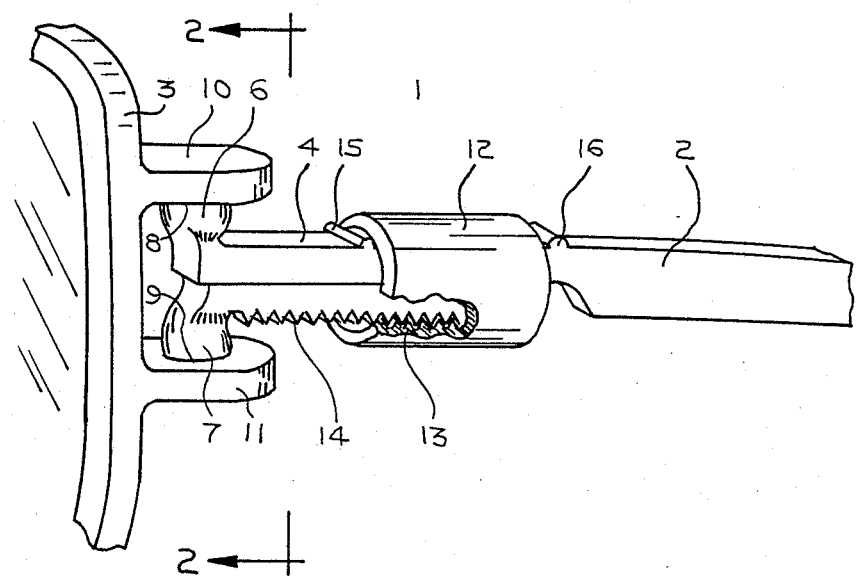
Fig. 1
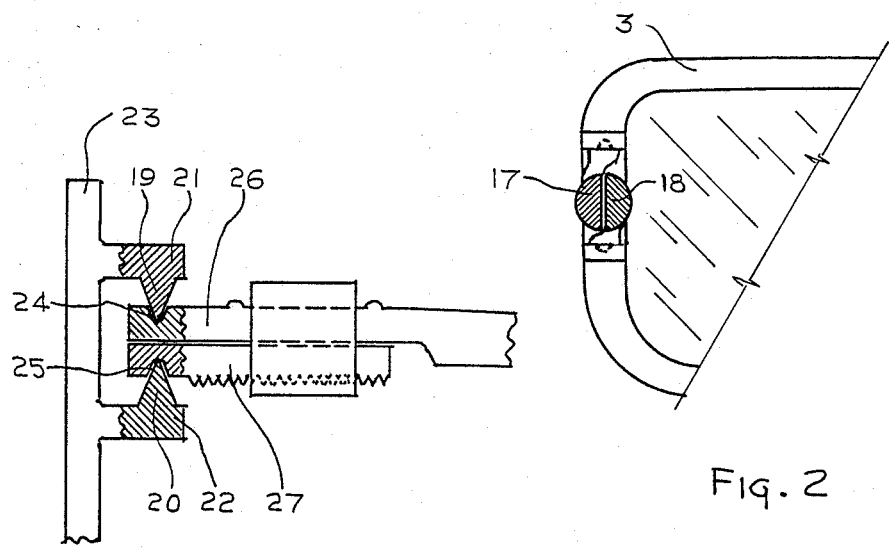
Fig. 2
Fig. 3

VERTICAL PLANE ADJUSTING MECHANISM FOR EYEGLASSES

BACKGROUND OF THE INVENTION

This Invention relates to eyeglasses and more particularly to sunglasses worn by sportsmen and outdoors enthusiasts.

It is desirable that sunglasses be adjustable to conform closely to the particular anatomy of the wearer. The slant of the lens-supporting frame in relation to the vertical plane not only contributes to the comfort and stability of the eyeglass, but also to the amount of sunlight which may impinge upon the eye of the wearer through the gap between the top of the frame and the wearer's brow, or from underneath the lenses in the case of light reflected by snow, sand or water. Proper slanting also prevents dehydration of the eyes caused by the wind.

The principal and secondary objects of this invention are to provide a basic eyeglass unit which can be rapidly and comfortably fitted to the wearer. More specifically, this invention provides for the rapid adjustment of the vertical alignment of the lens frame in relation to the horizontal axes of the templepieces.

These and other objects are achieved by attaching each templepiece to the lens frame with a split hinge whereby the templepiece is connected to the lens frame by two pivotal devices whose relative position can be adjusted along the axis of the templepiece.

BRIEF DESCRIPTION OF THE DRAWING

FIG. 1 is a perspective view of a templepiece and lens frame hinging mechanism;

FIG. 2 is a back, cross-sectional view taken along line 2—2 of FIG. 1 with a modified templepiece; and FIG. 3 is a diagrammatical rendition of an alternate embodiment of the invention.

DESCRIPTION OF THE PREFERRED EMBODIMENT OF THE INVENTION

Referring now to the drawing, there is shown in FIG. 1 a mechanism 1 which is used to hinge the earpiece or templepiece 2 of an eyeglass to the side of a lens frame 3. The forward end of the templepiece 2 is split longitudinally into an upper half 4 which is integral with the templepiece, and a lower half 5 which is free to slide against the upper half 4. Each half terminates into a ball 6 or 7 which is captured into a cavity 8 or 9 respectively formed into each of two projections 10 and 11 associated with the side of the frame 3. Thus, each of the two halves 4 and 5 are independently and pivotally connected to the frame extensions 10 and 11 by way of the bearings constituted by the bores 6 and 7 and cavities 8 and 9. A circular sleeve 12 is engaged around both arms 4 and 5 in a tight enough manner to keep the lower arm 5 against the lower side of the upper arm 4. The sleeve 12 has internal threads 13 which engages threads 14 of the same gauge on the underside of the lower arm 5. A pair of barriers 15 and 16 formed as part of the upper surface of the upper arm 4 on either side of the sleeve 12 prevent any axial movement of the sleeve in relationship to the upper arm 4 and, in general, the templepiece 2. It can now be understood that by rotating the sleeve 12 the position of the lower arm 5 in relation to the upper arm 4 can be axially changed. Any movement of the lower arm 5 in relation to the upper arm 4 modifies the alignment of the two bearings causing the frame 3 to change its planar orientation in relation to the templepiece 2. Thus the tilt of the lens frame 3 can be quickly adjusted at the choice of the wearer by turning the sleeves on both sides of the eyeglasses.

FIG. 2 illustrates a modified embodiment of the invention, wherein the end of the templepiece has been split along a vertical plan, rather than the horizontal plan as illustrated in FIG. 1. The two halves 17 and 18 have been given a semi-circular shape commensurate with the inside dimension of the adjusting sleeve (not shown).

FIG. 3 illustrates in a diagrammatic manner an alternate embodiment of the invention in which bore-and-cavity bearings of the first embodiment have been replaced by pins 19 and 20 which extend from the projections 21 and 22 on the side of the frame 23, and cooperate with cavities 24 and 25 bored into the two halves 26 and 27 of the templepiece end.

While the preferred and alternate embodiments of the invention have been described, other embodiments and modifications can be devised without departing from the spirit of the invention and the scope of the appended claims.

What is claimed is:

1. In a pair of eyeglasses having two lateral earpieces pivotally connected to opposite sides of the lens frame, a mechanism for adjustably tilting said frame in relation to each earpiece which comprises:
   the end of said earpiece which is pivotally connected to the frame being longitudinally split into a first arm forming an integral extension of said earpiece, and a second arm slidingly and contiguously attached to said first arm;
   first means for pivotally connecting said first arm to the frame;
   second means for pivotally connecting said second arm to the frame; and
   means for adjustably moving said second arm toward said frame in relation to, and independently from, said first arm.

2. The mechanism of claim 1, wherein said first and second means for pivotally connecting comprise:
   a first bearing on one side of the frame;
   a second bearing on said side, said second bearing being spaced apart from said first bearing;
   a first projection associated with said first arm and engaging said first bearing;
   a second projection associated with said second arm and engaging said second bearing.

3. The mechanism of claim 2, wherein said means for adjustably moving said second arm comprises:
   a circular sleeve having internal threads, said sleeve encircling said first and second arms;
   means for limiting the axial movement of said sleeve along one of said arms; and
   the other arm having a longitudinally threaded edge engaging the internal threads of the sleeve.

4. The mechanism of claim 3, wherein said bearings comprise:
   a first expansion projecting from one side of the frame and defining a first cavity having an axis parallel to the side of the frame;
   a second projection extending from said side of the frame and defining a second cavity distally facing said first cavity and having the same axis.

5. The mechanism of claim 4, wherein said second arm is slidingly mounted below said first arm.

6. The mechanism of claim 4, wherein said second arm is slidingly mounted against one side of said first arm.

7. The mechanism of claim 4, wherein each of said first and second arms has a semi-circular cross-section.

* * * * *